(No Model.) 2 Sheets—Sheet 1.

G. G. HACKETT.
REFRIGERATOR.

No. 506,593. Patented Oct. 10, 1893.

WITNESSES.
M. W. Jackson
F. M. Whipple

INVENTOR:
G. G. Hackett
by Wright Brown Crosby
Attys.

(No Model.) 2 Sheets—Sheet 2.
G. G. HACKETT.
REFRIGERATOR.
No. 506,593. Patented Oct. 10, 1893.
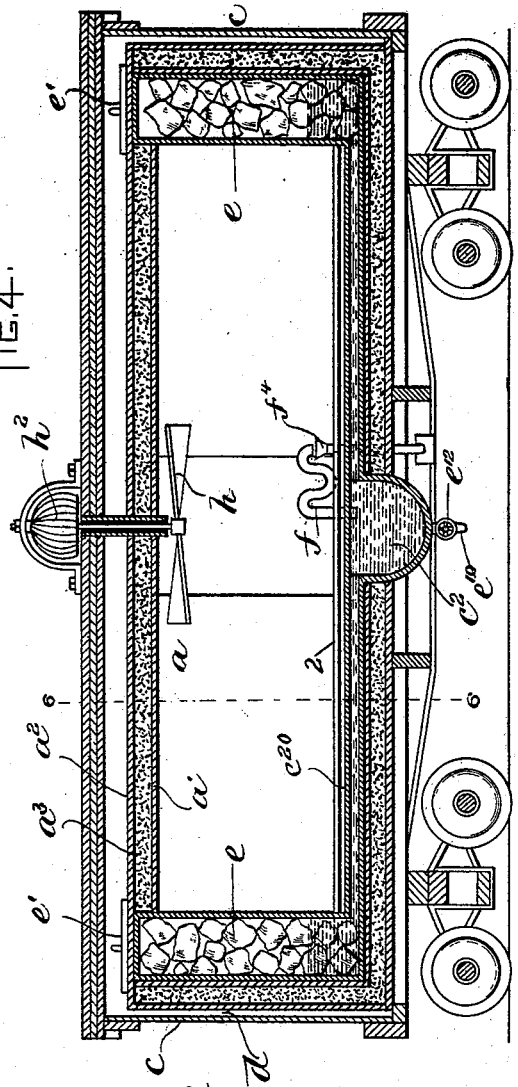
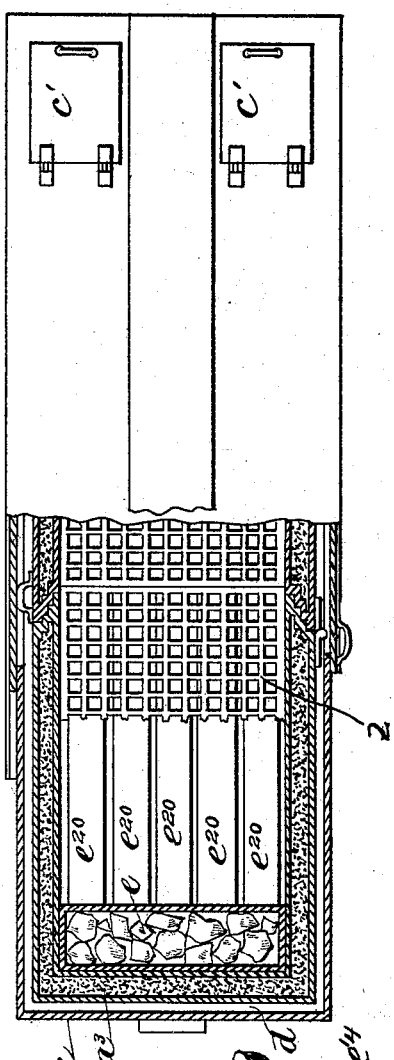
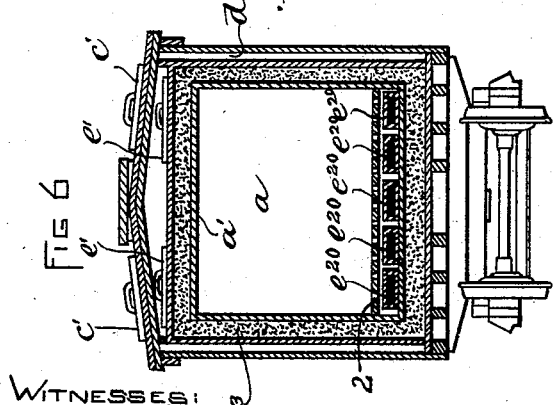
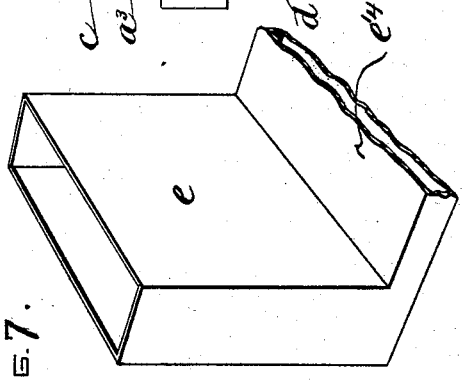
WITNESSES:
M. W. Jackson
F. M. Whipple
INVENTOR:
G. G. Hackett
by Wright Brown Kersley
Attys

UNITED STATES PATENT OFFICE.

GEORGE G. HACKETT, OF WAKEFIELD, MASSACHUSETTS.

REFRIGERATOR.

SPECIFICATION forming part of Letters Patent No. 506,593, dated October 10, 1893.

Application filed January 3, 1893. Serial No. 457,051. (No model.)

*To all whom it may concern:*

Be it known that I, GEORGE G. HACKETT, of Wakefield, in the county of Middlesex and State of Massachusetts, have invented certain new and useful Improvements in Refrigerators, of which the following is a specification.

This invention has for its object to provide an improved apparatus for maintaining a low temperature in a storage chamber or compartment, and the invention consists in the improvements which I will now proceed to describe and claim.

Figure 1:
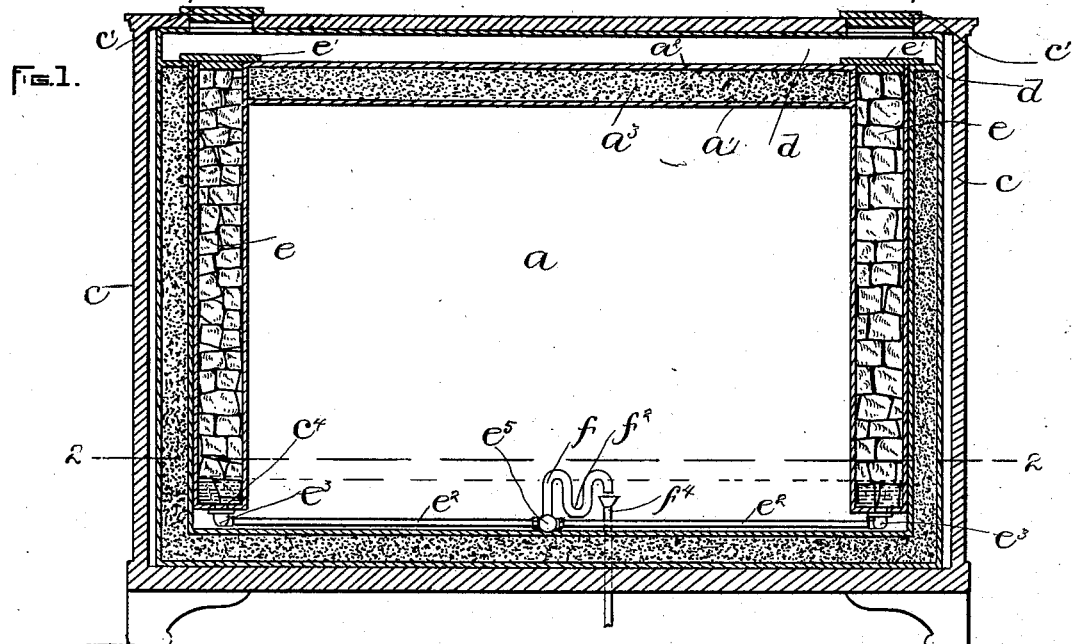
Figure 2:
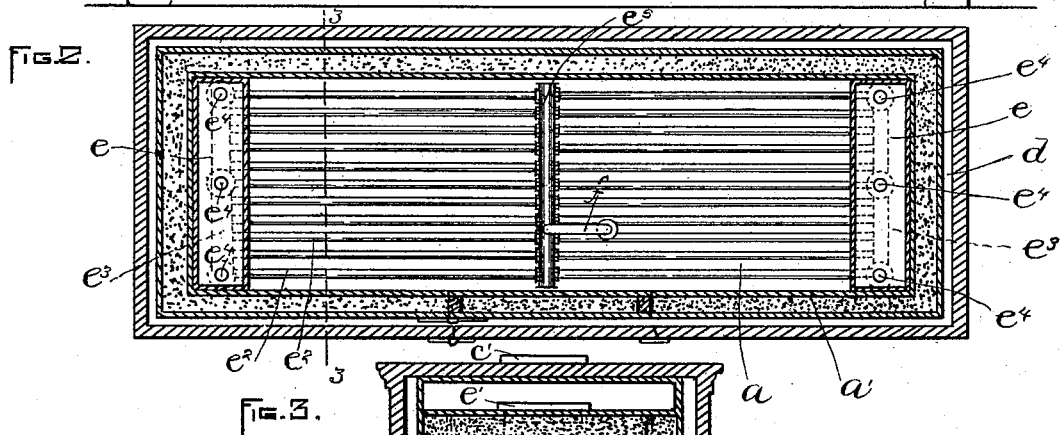
Figure 3:
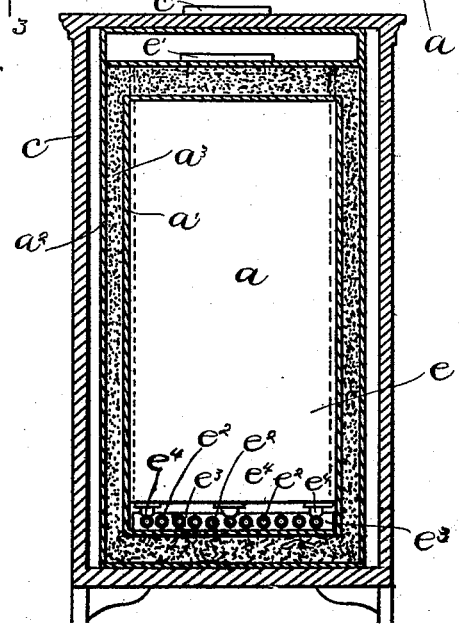

Of the accompanying drawings, forming part of this specification: Figure 1 represents a longitudinal vertical section of a refrigerator embodying my improvements. Fig. 2 represents a horizontal section on line 2—2, Fig. 1, and a plan view of the parts below said line. Fig. 3 represents a section on line 3—3, Fig. 2. Fig. 4 represents a longitudinal section of a refrigerator car embodying my improvements. Fig. 5 represents a partial top view and partial longitudinal section of the construction shown in Fig. 4. Fig. 6 represents a section on line 6—6, Fig. 4. Fig. 7 represents a perspective view showing a modification.

The same letters of reference indicate the same parts in all the figures.

Referring first to the construction shown in Figs. 1, 2 and 3, which is more particularly adapted for fixed or portable refrigerators for indoor use, $a$ represents the storage chamber or interior of a refrigerator. Said chamber is inclosed by an inner wall $a'$, and an outer wall $a^2$, said walls being separated by a space which contains a filling $a^3$ of any suitable material, preferably ground or broken shavings, as I find this material to be a good and economical non-conductor of heat. The bottom portion of the outer wall $a^2$ rests upon the bottom of the casing of the refrigerator. The double walls $a'$ $a^2$ extend entirely around the chamber $a$ and comprise the bottom, top, sides and ends of the chamber.

$c$ represents an outer casing, which is separated from the sides, top and ends of the double-walled casing above described by an air-space $d$, said air-space preventing heat from being conducted from the top, sides and ends of the outer casing to the wall of the inner casing to any considerable extent.

$e$ $e$ represent ice-boxes or receptacles, located at the ends of the chamber $a$ and at the upper portion thereof, each box preferably extending across the chamber, as shown in Figs. 2 and 3. The ice-boxes may be reached through openings in their upper portions, provided with covers $e'$, the exterior of the casing $c$ being provided with coinciding openings having covers $c'$. From the bottom of each ice-box extend horizontally a series of pipes $e^2$, extending along the bottom of the chamber $a$, said pipes being connected with heads or cross-pipes $c^3$, extending horizontally along the lower ends of the tanks and communicating with the tanks through passages $e^4 e^4$. The pipes $e^2$ communicate with a head or cross-pipe $e^5$, at or about the center of the refrigerator. The heads $e^3$ $e^3$ and $e^5$ and pipes $e^2$ receive the water caused by the melting of the ice in the tanks.

$f$ represents an overflow pipe, one end of which extends upwardly from the head $e^5$, its other end being over a waste-pipe $f^4$ extending downwardly through the bottom of the refrigerator. Said overflow pipe has a bent portion or trap $f^2$, to prevent the entrance of air through it into the tank. The overflow pipe extends upwardly into the refrigerator above the pipes $e^2$, so that water can accumulate in said pipes and in the lower portion of the tanks $e$ to the level of the upper portion of the pipe $f$.

It will be seen that the external surfaces of the ice-boxes $e$ and pipes $e^2$ are exposed to the interior of the chamber $a$, the pipes $e^2$ presenting large areas of surface at the bottom portion of said chamber, while the boxes $e$ constitute the main portion of the ends of the chamber; hence there are large areas of cooled surface presented to the chamber.

In practice, I fill the pipes or conduits $e^2$ and the lower portions of the tanks $e$ with a liquid refrigerating compound, composed preferably of muriate of ammonia, bicarbonate of soda, permanganate of potash and brine, said compound filling the lower portions of the tanks so that it is in contact with the ice therein, the compound being thus kept at a very low temperature.

The arrangement of the head $e^5$ and the overflow pipe $f$ is such that the pipes $e^2$ cannot be emptied of their contents, but are always filled, the liquid compound being caused by the arrangement of the overflow pipe to stand in the lower portions of the ice-boxes in contact with the ice. The double wall and the filling surrounding the chamber $a$, and the outer casing and air-space covering the top, sides and ends of said double wall, reduce to the minimum the liability of heat being conducted from the heated external surface of the refrigerator into the chamber $a$.

I do not limit myself to the employment of two ice-boxes, as here shown, and may employ one ice-box or any other desired number, and the said box or boxes may be at any suitable part or parts of the chamber.

In Figs. 4, 5 and 6, I show an embodiment of my invention in a refrigerator car, the arrangement being substantially the same as that above described, excepting that the conduits which extend along the floor of the car, instead of being circular pipes or tubing as shown in Figs. 1, 2 and 3, are flattened pipes or tubes, preferably having a rectangular cross section, as shown in Fig. 6. In this instance, a tank $c^2$ is employed, which communicates with the conduits $e^{20}$ at the center of the car, and has an outlet pipe $e^{10}$, provided with a cock or valve $e^{12}$. The overflow pipe communicates with said tank, as shown in Fig. 4.

In the upper portion of the chamber $a$ is an air-raising apparatus or fan $h$, which is so constructed that, when rotated, it will cause an upward movement of the air, thus raising the cold air which is in contact with the cold surfaces of the conduits along the bottom of the car, and causing it to displace the warmer air in the upper portion of the chamber, thus equalizing the temperature throughout the chamber. The fan $h$ may be rotated by an electric or other motor. I have here shown the shaft of the fan extended through the roof of the car and provided above the roof with a wind-wheel $h^2$, adapted to be rotated by the action of the air when the car is in motion.

It will be seen that, in both constructions above described the bottom of the car is provided with artificially-cooled surfaces, which, with the areas of cooling surface afforded by the walls of the ice-boxes, enables the temperature of the chamber to be kept at a suitably low point.

I do not limit myself to the employment of a series of pipes or conduits extending along the bottom of the chamber $a$. In Fig. 7, I show a modification representing one of the ice receptacles $e$ and a portion of a single conduit $e^{14}$, which may be supposed to extend along the bottom of the car from one ice receptacle to the other, said conduit being of sufficient width to extend practically across the bottom of the chamber and adapted to serve the same purpose as the series of pipes or conduits above described. It will be understood, therefore, that although I have specified a plurality of conduits in the following claims, I am not limited thereto, the single conduit $e^{14}$ being an equivalent of the series of conduits. The said single conduit should be provided with an overflow pipe, arranged to prevent the emptying of the conduit, as already described in connection with the series of conduits.

I find that the combined action of ice and suitable chemicals, such as those above mentioned, enables a compartment or chamber to be kept at a low temperature for a very considerable length of time at a small expense, as compared with other methods of and means for refrigeration known to me. The essential feature of my improved method is the action of ice upon a liquid chemical compound, the compound being of such nature that the action of the ice will keep it at a very low temperature with the minimum waste or loss of ice.

I do not limit myself to the particular chemicals here specified, and may use any other suitable liquid compound or mixture. A reasonably successful result may be produced by using simply brine and ice. The action of the ice upon a liquid, substantially such as brine or brine and muriate of ammonia, bicarbonate of soda and permanganate of potash, converts said liquid into a refrigerating agent which, by its circulation through pipes or conduits exposed externally to the chamber or compartment to be cooled, effectively absorbs heat from said chamber and maintains a low degree of temperature therein at an economical rate.

Preferably the floor of the storage chamber is composed of a grating, as shown at 2 in Figs. 4, 5 and 6, underneath which the conduits for the liquid refrigerant are arranged; but in some cases the grating might be dispensed with, as in Figs. 1 and 2, and the outer upper surface of the conduits would then constitute the floor of the storage chamber. In either case, however, the actual conduits (the passages for the liquid) are under the floor of the said chamber.

I claim—

1. A refrigerator, comprising in its construction a storage chamber, a vertically-arranged receptacle therein adapted to receive ice, conduits communicating with said receptacle and extending along the bottom of the car, under the floor of the storage chamber and an outlet or overflow pipe connected with said conduits but located above the latter so that the conduits cannot be emptied through said outlet, the said conduits being adapted to be kept constantly filled with refrigerating compound whereby large areas of cooling or heat-absorbing surface will be presented at the bottom of the car, as set forth.

2. A refrigerator, comprising in its construction a storage chamber, vertically-arranged ice-receptacles at the opposite ends of the chamber, conduits communicating with the lower portions of said receptacles and extending along the bottom of the chamber, and an outlet or overflow pipe connected with said conduits and arranged to permit an escape of surplus liquid without emptying the conduits, as set forth.

3. A refrigerator, comprising in its construction a storage chamber, ice-boxes located in said chamber and at the ends thereof, heads below said boxes, horizontal pipes extending along the bottom of the chamber from said heads to a central head, and a trapped overflow pipe connected with said central head, as set forth.

In testimony whereof I have signed my name to this specification, in the presence of two subscribing witnesses, this 24th day of December, A. D. 1892.

GEO. G. HACKETT.

Witnesses:
C. F. BROWN,
M. W. JACKSON.